United States Patent [19]
Nakahata et al.

[11] Patent Number: 5,529,962
[45] Date of Patent: * Jun. 25, 1996

[54] ALUMINUM NITRIDE SINTERED BODY AND METHOD OF PRODUCING THE SAME

[75] Inventors: Seiji Nakahata; Takahiro Matsuura; Kouichi Sogabe; Akira Yamakawa, all of Itami, Japan

[73] Assignee: Sumitomo Electric Industries, Ltd., Japan

[*] Notice: The portion of the term of this patent subsequent to Jan. 9, 1996, has been disclaimed.

[21] Appl. No.: 406,242

[22] Filed: Mar. 14, 1995

Related U.S. Application Data

[62] Division of Ser. No. 178,642, Jan. 5, 1994, Pat. No. 5,482,905.

[30] Foreign Application Priority Data

Feb. 5, 1993 [JP] Japan .................................. 5-42270

[51] Int. Cl.$^6$ ................................................. C04B 35/58
[52] U.S. Cl. ................................................. 501/96; 501/98
[58] Field of Search .................................. 501/96, 98

[56] References Cited

U.S. PATENT DOCUMENTS

| | | | |
|---|---|---|---|
| 4,591,537 | 5/1986 | Aldinger et al. | 428/698 |
| 4,908,173 | 3/1990 | Schwetz et al. | 264/63 |
| 4,908,197 | 3/1990 | Bolt et al. | 423/412 |
| 4,983,462 | 1/1991 | Hiai et al. | 428/432 |
| 5,001,089 | 3/1991 | Kasori et al. | 501/96 |
| 5,034,357 | 7/1991 | Yamakawa et al. | 501/96 |

FOREIGN PATENT DOCUMENTS

| | | |
|---|---|---|
| 0114193 | 8/1984 | European Pat. Off. |
| 63-129075 | 6/1988 | Japan . |
| 9301147 | 1/1993 | WIPO . |

OTHER PUBLICATIONS

Slack, *The Journal of Physics and Chemistry Solids*, vol. 34, No. 2, pp. 321–335, "Nonmetallic Crystals With High Thermal Conductivity" Feb. 1973.

Oktmoto et al., *Journal of the Ceramic Society of Japan*, Internat, Edit. vol. 97, "Effect of Microstructure on Thermal Conductivity of Ain Ceramics", Dec. 1989.

Gmelins, Gmelins Handbuch Der Anorganischen Chemie, pp. 145–146, "Aluminium", 1934 (No month).

*Primary Examiner*—Deborah Jones
*Attorney, Agent, or Firm*—Bierman and Muserlian

[57] ABSTRACT

An aluminum nitride sintered body comprising aluminum nitride crystals belonging to a Wurtzite hexagonal crystal system wherein the 3 axes a, b and c of the unit lattice of the crystal are defined such that the ratio b/a of the lengths of the axes b and a is 1,000 near the center of the crystal grain and lies within the range 0.997–1.003 in the vicinity of the grain boundary phase. Aluminum nitride sintered body is produced by sintering a molded body of a raw material powder having aluminum and nitrogen as its principal components at a temperature of 1700°–1900° C. in a non-oxidizing atmosphere having a partial pressure of carbon monoxide or carbon of not more than 200 ppm and then cooling the sintered body to 1500° C. or a lower temperature at a rate of 5° C./min or less. The aluminum nitride sintered body has a greatly improved thermal conductivity and, therefore, is suitable for heat slingers, substrates or the like for semiconductor devices.

5 Claims, 7 Drawing Sheets

500nm

ALUMINUM NITRIDE SINTERED BODY AND METHOD OF PRODUCING THE SAME

This application is a division of application No. 08/178,642, filed Jan. 5, 1994, now U.S. Pat. No. 5,482,905.

BACKGROUND OF THE INVENTION

1. Field of the Invention

This invention relates to an aluminum nitride (AlN) sintered body having an excellent thermal conductivity, and a method of manufacturing such a body.

2. Description of the Prior Art

Aluminum nitride has very good electrical insulation properties and a very high thermal conductivity. For this reason, aluminum nitride sintered bodies are used as a replacement for beryllia (BeO) in power transistor heat slingers or the like, as a replacement for alumina ($Al_2O_3$) in substrates or packaging materials for semiconductor devices, and in laser tubes, etc.

Although the thermal conductivity of aluminum nitride sintered bodies is far higher than that of other ceramic materials, the thermal conductivity of actual aluminum nitride sintered bodies industrially produced does not exceed about half the theoretical value of 320 W/mK. It is known that the thermal conductivity of aluminum nitride sintered bodies largely reduce when it contains impurities, such as silicon or oxygen, in solid solution. Recently, due to higher purity of the raw material powder and improved sintering techniques, it has become possible to obtain sintered bodies having a thermal conductivity of at most approximately 180 W/mK.

However, even such conventional aluminum nitride sintered bodies are still unsatisfactory in their thermal conductivity and, with recent higher levels of integration of IC and LSI, a need has emerged for heat slingers, substrates, packaging materials or the like with enhanced heat releasing properties for the use in semiconductor devices.

SUMMARY OF THE INVENTION

In view of the foregoing, it is therefore an object of this invention to greatly improve the thermal conductivity of an aluminum nitride sintered body and thereby to provide an aluminum nitride sintered body of high thermal conductivity suitable for heat slingers, substrates, etc., for semiconductor devices.

According to the present invention, there is provided an aluminum nitride sintered body comprising aluminum nitride crystals belonging to a Wurtzite hexagonal crystal system wherein the 3 axes a, b and c of the unit lattice of the crystal are defined such that the ratio b/a of the lengths of the axes b and a is 1.000 near the center of the crystal grain and lies within the range 0.997–1.003 in the vicinity of the grain boundary phase. The aluminum nitride sintered body may have a thermal conductivity of 150 W/m.K or higher and a mechanical strength of 35 kg/mm² or higher.

The aforesaid aluminum nitride sintered body is produced by a method comprising sintering a body molded from a raw material powder having aluminum and nitrogen as its principal components at a temperature of 1700°–1900° C. in a non-oxidizing atmosphere having a partial pressure of carbon monoxide or carbon of not more than 200 ppm, and then cooling the sintered body to 1500° C. or lower temperature at a rate of 5° C./min or less.

BRIEF DESCRIPTION OF THE DRAWINGS

FIG. 2a is an electron micrograph. FIG. 2b is a convergent beam electron diffraction pattern near the crystal grain center, and FIG. 2c is a convergent beam electron diffraction pattern in the vicinity of the grain boundary phase.

FIG. 3a is an electron micrograph. FIG. 3b is a convergent beam electron diffraction pattern near the crystal grain center and FIG. 3c is a convergent beam electron diffraction pattern in the vicinity in the grain boundary phase.

FIG. 4a is an electron micrograph. FIG. 4b is a convergent beam electron diffraction pattern near the crystal grain center and FIG. 4c is a convergent beam electron diffraction pattern in the vicinity of the grain boundary phase.

DETAILED DESCRIPTION OF THE PREFERRED EMBODIMENTS

In order to investigate why the theoretical thermal conductivity of aluminum nitride sintered bodies could not be attained in practice, the inventors carried out detailed studies on aluminum nitride crystals of sintered bodies by means of convergent beam electron diffraction using a transmission electron microscope (hereinafter referred to as "TEM"), and thereby found that the structure of the aluminum nitride crystals was somewhat distorted with respect to the original Wurtzite hexagonal crystal system.

Figure 1:
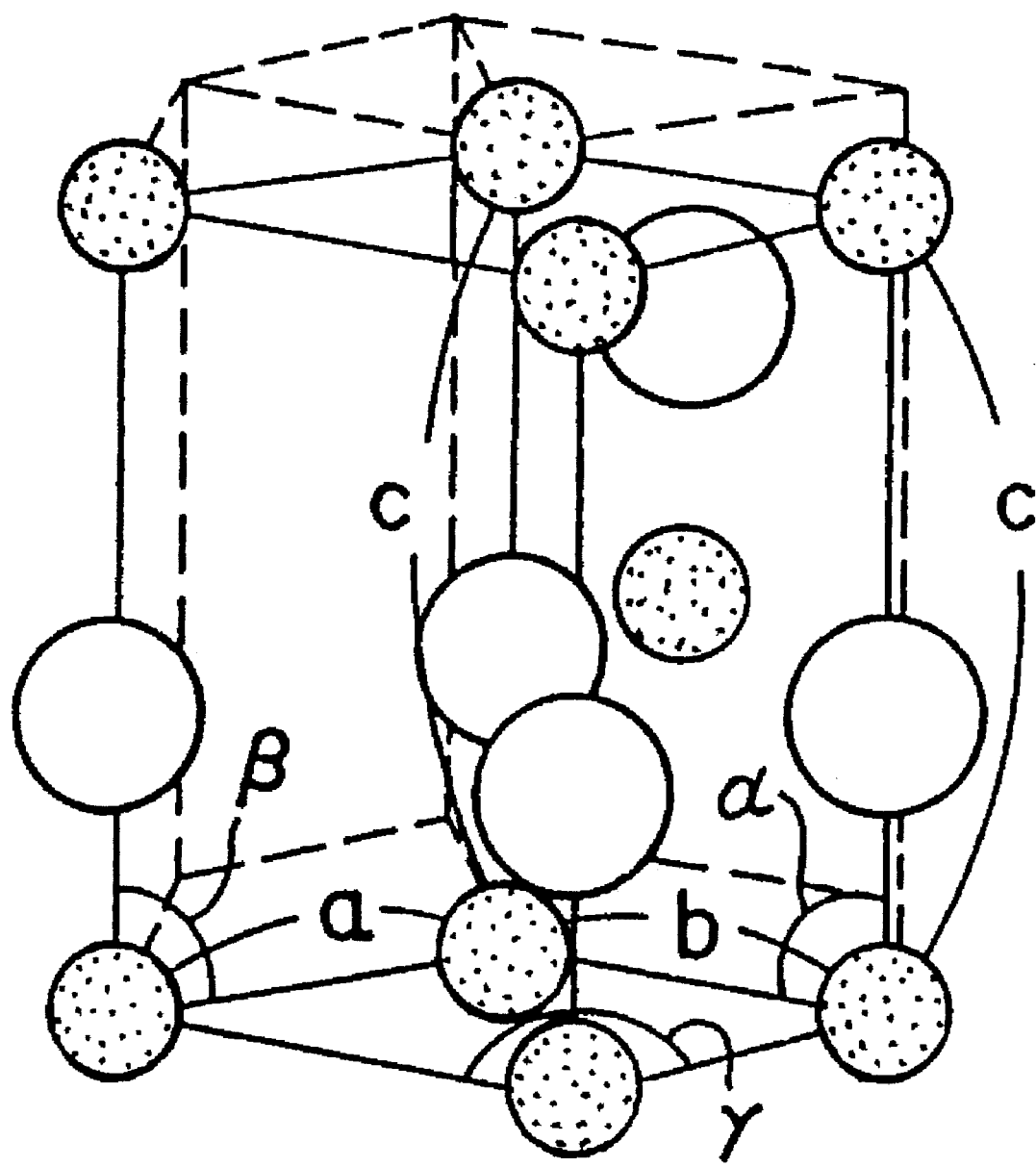
FIG. 1 is a schematic view of the crystal structure of an aluminum nitride crystal belonging to the Wurtzite hexagonal crystal system. The solid line indicates the unit lattice.

More specifically, as shown in FIG. 1, the aluminum nitride crystal structure belongs to a Wurtzite hexagonal crystal system wherein each Al or N atom is surrounded by four other atoms disposed at the corners of a regular tetrahedron. In the unit lattice of this crystal structure (solid line in FIG. 1), the lengths of the three axes a, b and c, which are lattice constants, should be such that $a=b\neq c$ and the angles between the axes a, b and c should be $\alpha=\beta=90°$, $\gamma=120°$.

However, according to research carried out by the Inventors, in the aluminum nitride crystals of an actual sintered body, although the ratio b/a of the lengths of the axes b and a of the unit lattice of the crystal has the theoretical value of 1.000 near the crystal grain center, it is always not more than 0.996 or not less than 1.004 in the vicinity of its grain boundary phase. Further, when the crystals are severely distorted, there are some crystals wherein the lengths of the axes b and a are not the same so that the ratio b/a is not 1.000 even near the crystal grain center.

It is known that heat is conducted through an aluminum nitride sintered body by means of phonons. It is thought that the distortion of the crystal lattice hereinabove described interferes with the propagation of these phonons and lowers the thermal conductivity of the sintered body.

Further, it was found that since in the aluminum nitride crystal the axis a or b was approximately 0.4–0.5% greater in the vicinity of the grain boundary phase than in the crystal grain center, a tensile stress existed in the aluminum nitride crystals. It can be conjectured that this stress tends to make the sintered body more fragile and reduce its mechanical strength below its inherent mechanical strength level.

The Inventors have studied also the reason for this distortion of the aluminum nitride crystals in the sintered body and the stage of occurrence of such a distortion. They concluded that the distortion occurred during cooling from the sintering temperature of 1700°–1900° C. to 1500° C. in case where sintering has been conducted at 1700° to 1900° C. in a furnace atmosphere having a partial pressure of carbon monoxide or carbon exceeding 200 ppm, and that it was due to a difference of thermal expansion coefficient between the aluminum nitride crystals and their grain boundary phase as a result of the conventional rapid cooling rate of 10°–20° C./min and due to the incorporation of carbon component in the solid solution state into the aluminum nitride crystal lattice.

Based on these findings, the Inventors were able to obtain an aluminum nitride sintered body wherein the ratio b/a of the lengths of the axes b and a of the unit lattice of the aluminum nitride crystals was within the range 0.997–1.003 even in the vicinity of the grain boundary phase of the crystals, and wherein the crystals were less distorted than in a conventional sintered body. In the production process of an aluminum nitride sintered body, this was achieved by cooling an aluminum nitride sintered body to a temperature of 1500° C. or less at a rate not exceeding 5° C./min after sintering a compact of a raw material powder comprising mainly aluminum and nitrogen, and by controlling the partial pressure of carbon monoxide or carbon in the atmosphere in a sintering furnace to 200 ppm or less.

The raw material powder is preferably of high purity, contains impurities, such as Si, O and Fe, at minimized levels and has a small average particle size. However, when one or more compounds of Ti, V, Co and the like are added to the raw material powder and sintered, distortions in the vicinity of the grain boundary phase of the aluminum nitride crystals can be reduced. The reason for this is not clear, but is thought that cationic impurities invade Al sites in the aluminum nitride crystal lattice so as to reduce distortions.

The aluminum nitride sintered body according to this invention is therefore characterized in that, concerning the axes a, b and c of the unit lattice of the crystals of the Wurtzite hexagonal crystal system to which the aluminum nitride belongs, the ratio b/a of the lengths b and a is 1.000 near the crystal grain center and is within the range of 0.997–1.003 in the vicinity of the grain boundary phase.

Analyses through convergent beam electron diffraction patterns by the TEM method were performed on aluminum nitride sintered bodies obtained by sintering at 1900° C. in a furnace atmosphere having a partial pressure of CO of 400 ppm and cooling from 1900° C. to 1500° C. at a rate of 10°–20° C./min or more as in the conventional manufacturing method, and aluminum nitride sintered bodies obtained by sintering at 1900° C. in a furnace atmosphere having a partial pressure of CO of 100 ppm and cooling from 1900° C. to 1500° C. at a rate not exceeding 5° C./min in accordance with the present invention. In the case of the examples given here, the conventional aluminum sintered body had a thermal conductivity of 178 W/m.K and a mechanical strength of 33 kg/mm$^2$, while the aluminum sintered body according to this invention had a thermal conductivity of 230 W/m.K and a mechanical strength of 42 kg/mm$^2$.

Figure 3A:
FIGS. 3a to 3c are photographs showing the crystal structure of a conventional aluminum nitride sintered body.
Figure 3B:
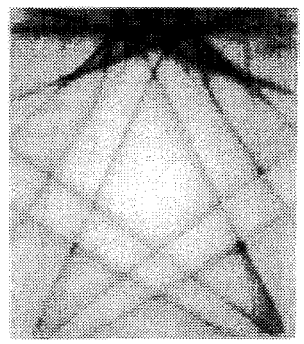
Figure 3C:
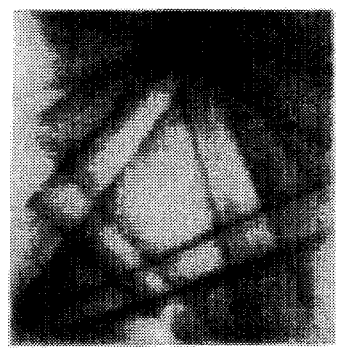

It is seen that, in crystals of the conventional aluminum nitride sintered body, the TEM convergent beam electron diffraction pattern (insert 1 on the lower left of FIG. 3) obtained near the crystal grain center 1 shown in the TEM image (the upper part of FIG. 3) has mirror plane symmetry with respect to the X–Y axis shown in the photograph, and the crystals are free from distortion at the near center thereof. On the other hand, in the convergent beam electron diffraction pattern (insert 3 on the lower right of FIG. 3) obtained in the vicinity 3 of the grain boundary phase of the same crystals, this mirror plane symmetry is lost. Analyzing these patterns, it is found that the lengths of the axes a and b, which are ideally equal, are unequal in the vicinity of the grain boundary phase, the ratio b/a then being 1.004.

Figure 4A:
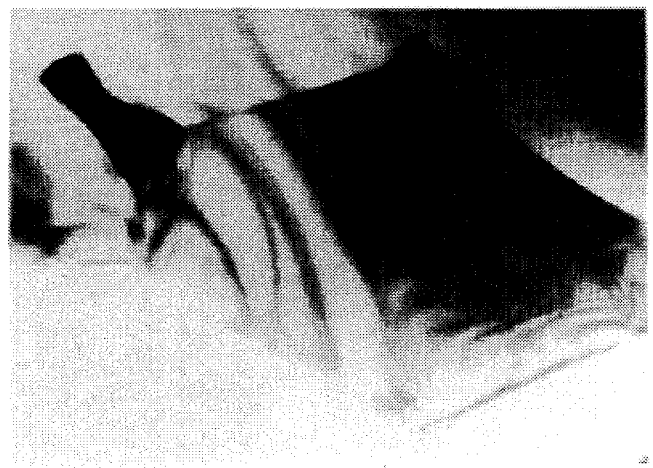
FIGS. 4a to 4c are photographs showing another crystal structure of a conventional aluminum nitride sintered body.
Figure 4B:
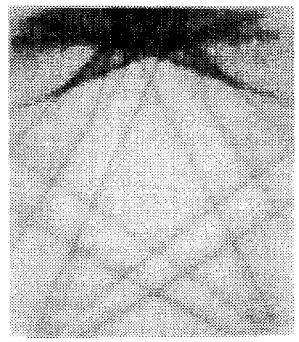
Figure 4C:

In TEM images (upper part of FIG. 4) of other aluminum nitride crystals in conventional sintered bodies, mirror plane symmetry was found to be lost both in the convergent beam electron diffraction pattern (insert 1 on the lower left of FIG. 4) obtained near the crystal grain center 1 and in the convergent beam electron diffraction pattern (insert 3 on the lower right of FIG. 4) obtained in the vicinity 3 of the grain boundary phase. In this case, the ratio b/a of the axes b and a was 0.997 near the crystal grain center and 0.994 near the grain boundary phase, showing that there were some crystals with overall distortion.

Figure 2A:
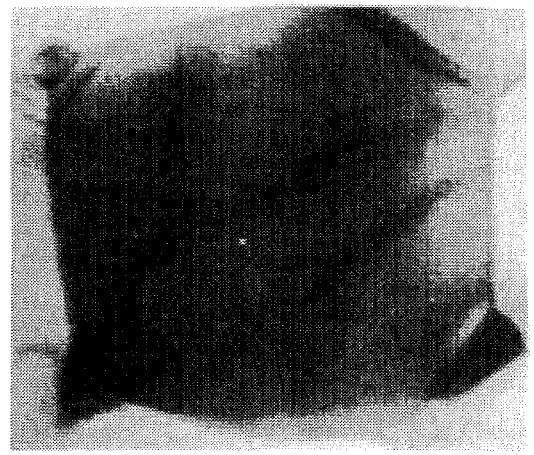
FIGS. 2a to 2c are photographs showing the crystal structure of an aluminum nitride sintered body according to this invention.
Figure 2B:
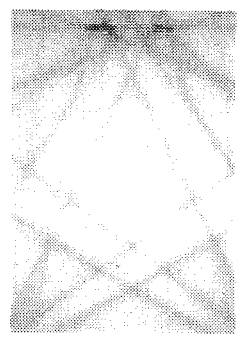
Figure 2C:

On the other hand, in the aluminum nitride sintered body of the present invention, the convergent beam electron diffraction pattern (insert 1 on the lower left of FIG. 2) near the crystal grain center 1 shown in the TEM image (upper part of FIG. 2) of the aluminum nitride crystals possessed mirror plane symmetry, the ratio b/a of the lengths of the axes b and a being 1.000. This showed that the crystals were not distorted. In the convergent beam electron diffraction pattern (insert 3 on the lower right of FIG. 2) in the vicinity 3 of the grain boundary phase of the same crystals, there was some slight loss of mirror plane symmetry, however the ratio b/a of the lengths of the axes b and a was 1.001 showing that the distortion had been suppressed to a low level.

In the aluminum nitride sintered body according to this invention, therefore, the crystals have little distortion and their structure is very close to that of the original Wurtzite hexagonal crystal system inherent to aluminum nitride crystals. As a result, at a sintering temperature of, for example, 1900° C., the thermal conductivity of the sintered body is improved by 35% or more and the mechanical strength by 30% or more as compared with the conventional case. At a sintering temperature of 1800° C., the thermal conductivity is improved by 37% or more, and the mechanical strength by 28% or more.

EXAMPLE 1

To type A of the three types of aluminum nitride raw material powders shown in the Table 1 below, 1.0 wt % of $Y_2O_3$ was added as a sintering aid and the mixture was blended in alcohol using a rotary ball mill for 10 hours. 3 wt % of polyvinylbutyral was then added as a binder and the mixture was blended again and dried.

TABLE 1

| Type of raw material powder | A | B | C |
| --- | --- | --- | --- |
| Total oxygen content (wt %) | 1.3 | 0.9 | 1.2 |
| C content (ppm) | 300 | 230 | 500 |
| Fe content (ppm) | <10 | <10 | <10 |
| Si content (ppm) | 9 | 50 | 82 |
| Specific surface area (m²/g) | 3.5 | 2.8 | 2.7 |
| Average particle size (μm) | 1.3 | 1.1 | 1.0 |

The powder thus obtained was molded in a dry press at a press pressure of 1.5 ton/cm² or higher and the binder was removed from the molded product at 600° C. for 3 hours. The products were then sintered at 1750° C. or 1900° C. for 3 hours in a nitrogen atmosphere having a partial pressure of CO as shown below Table 2, allowed to cool to 1500° C. at a rate of 3°–15° C./min and then further cooled to room temperature to obtain each sintered body sample.

The density, thermal conductivity and mechanical strength of each sintered body sample obtained were measured. The ratio b/a of the lengths of the axes b and a in the vicinity of the grain boundary phase of the AlN crystals was measured at 10 points through convergent beam electron diffraction by TEM and the absolute value |1−b/a| was found from the average value. The results are shown in Table 2 together with the sintering temperature and cooling rate.

TABLE 2

| Sample No. | Sintering temp (°C.) | Cooling rate (°C./min) | Density (g/cm³) | \|1 − b/a\| near grain boundary | Thermal conductivity (W/m · K) | Mechanical strength (kg/mm²) |
| --- | --- | --- | --- | --- | --- | --- |
| 1 | 1900 | 3 | 3.29 | 0.001 | 230 | 43 |
| 2 | 1900 | 5 | 3.28 | 0.003 | 210 | 42 |
| 3 | 1750 | 3 | 3.28 | 0.001 | 220 | 43 |
| 4 | 1750 | 5 | 3.28 | 0.001 | 220 | 42 |
| 5* | 1900 | 7 | 3.29 | 0.004 | 150 | 32 |
| 6* | 1900 | 10 | 3.28 | 0.005 | 135 | 31 |
| 7* | 1900 | 15 | 3.28 | 0.005 | 130 | 31 |
| 8* | 1750 | 7 | 3.28 | 0.004 | 140 | 31 |
| 9* | 1750 | 10 | 3.27 | 0.004 | 140 | 31 |
| 10* | 1750 | 15 | 3.28 | 0.005 | 130 | 31 |

Figure 5:
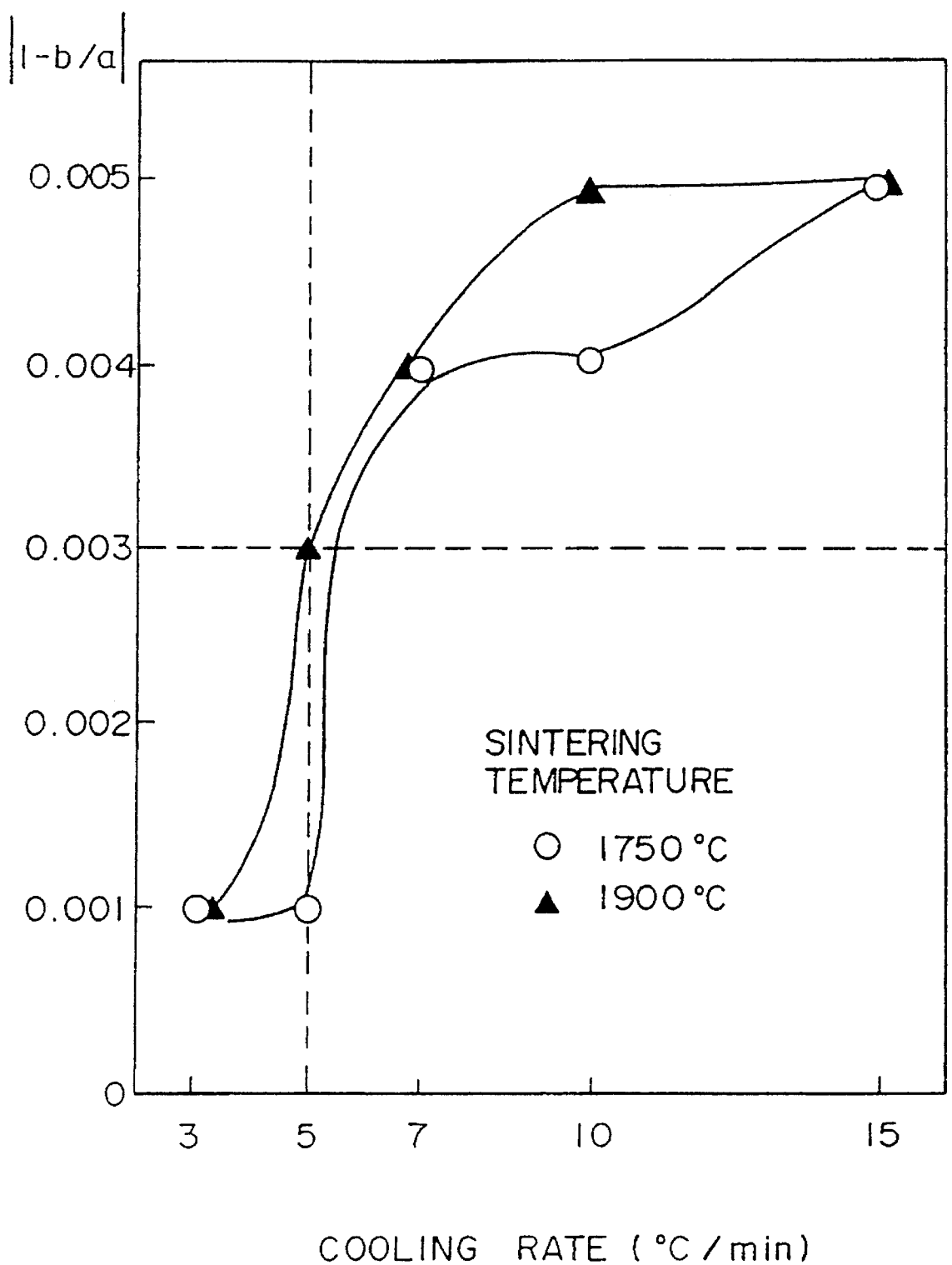
FIG. 5 is a graph showing the relation between the cooling rate to 1500° C. after sintering and the absolute value of |1−b/a| determined from the ratio of the lengths of axes a and b of the aluminum nitride crystal lattice in the vicinity of the grain boundary phase in the aluminum nitride sintered body.
Figure 6:
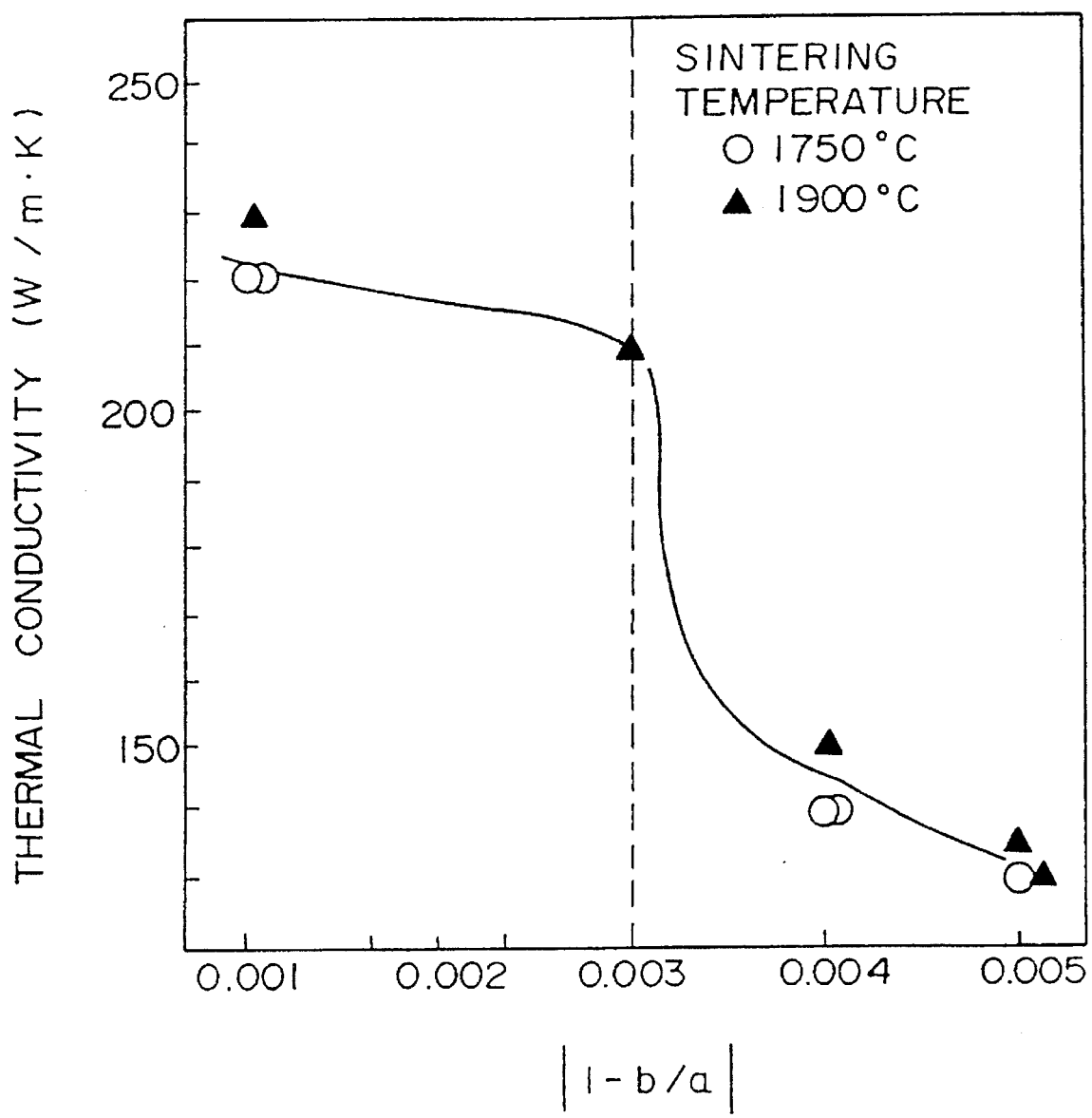
FIG. 6 is a graph showing the relation between the absolute value of |1−b/a| determined from the ratio of the lengths of axes a and b of the aluminum nitride crystal lattice in the vicinity of the grain boundary phase in the aluminum nitride sintered body, and the thermal conductivity of the sintered body.
Figure 7:
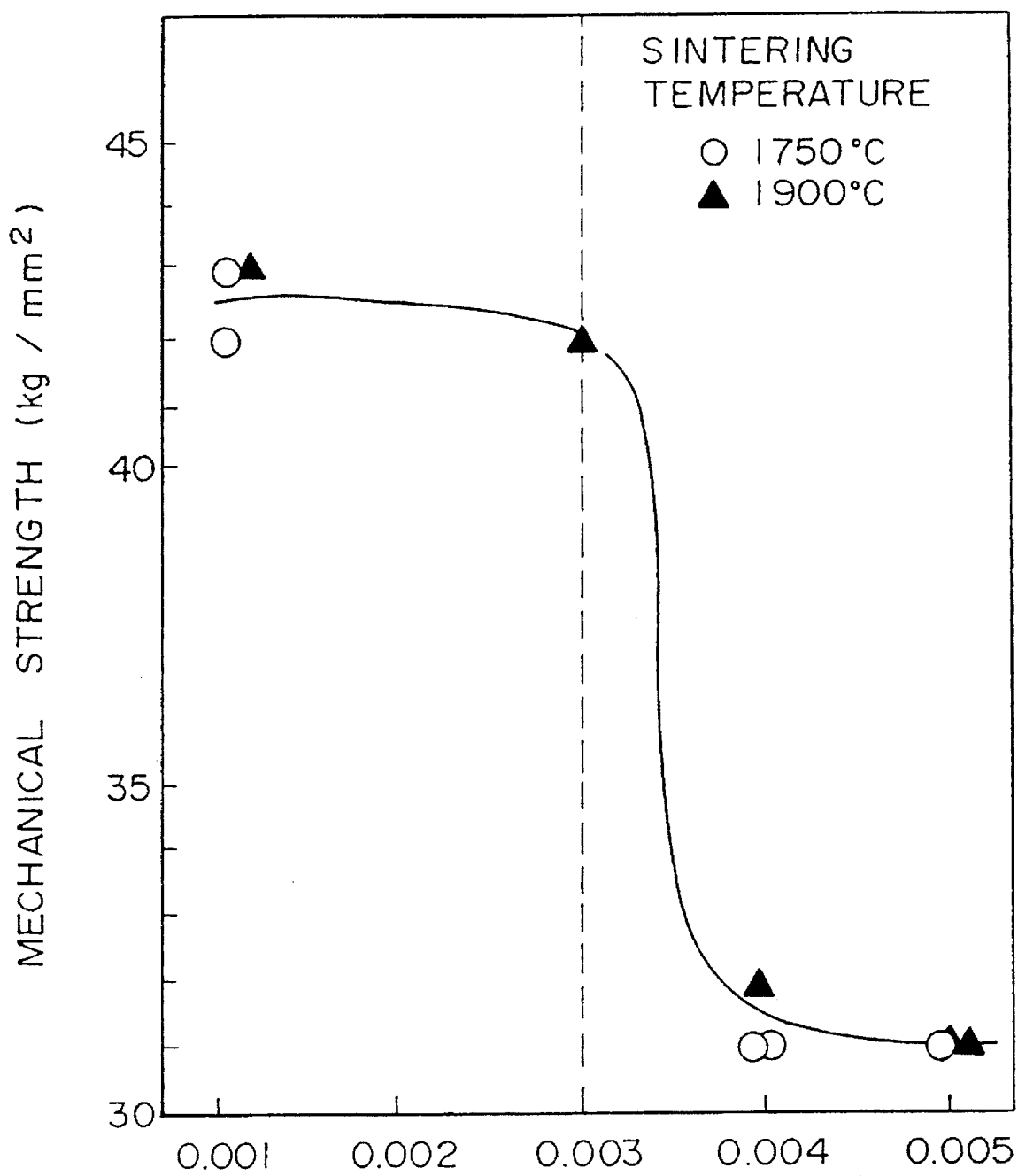
FIG. 7 is a graph showing the relation between the absolute value of |1−b/a| determined from the ratio of the lengths of axes a and b of the aluminum nitride crystal lattice in the vicinity of the grain boundary phase in the aluminum nitride sintered body, and the mechanical strength of the sintered body.

Note: Samples denoted by * in the table are comparative samples.
Partial pressure of CO:
Samples 1–4: not higher than 200 ppm
Samples 5–10: not lower than 300 ppm From the results of Table 2 above, FIG. 5 shows the relation between cooling rate and |1−b/a|. FIG. 6 shows the relation between |1−b/a| and thermal conductivity and FIG. 7 shows the relation between |1−b/a| and mechanical strength. From Table 2 and FIGS. 5–7, it is seen that when the cooling rate is higher than 5° C./min, the value of |1−b/a| of the AlN crystals obtained sharply increases in the vicinity of the grain boundary phase. Therefore, by controlling the cooling rate at 5° C./min or less, the lengths of the axes a and b of the unit lattice of the AlN crystals can be made nearly equal even in the vicinity of the grain boundary phase and, as a result, the thermal conductivity and mechanical strength of the AlN sintered body are greatly improved.

EXAMPLE 2

Sintered body samples were manufactured by sintering at temperatures of 1750° C. and 1900° C. for 3 hours according to the method of Example 1, using the 3 types of AlN raw material powders shown in Table 1 above. The sintering was carried out in a nitrogen atmosphere having a partial pressures of CO of not higher than 200 ppm for Samples 11 to 20 and a partial pressure of not less than 300 ppm for Samples 21 to 26. The additives including a sintering aid, their addition amounts and the rate of cooling to 1500° C. were as shown in Table 3 below.

TABLE 3

| Sample No. | Raw material powder | Additives (wt. %) | Cooling rate (°C./min) |
| --- | --- | --- | --- |
| 11 | A | $Y_2O_3$(1.0) | 3 |
| 12 | A | $Y_2O_3$(1.5) | 5 |
| 13 | B | $Y_2O_3$(1.0) + $V_2O_5$(0.26) | 5 |
| 14 | B | $Y_2O_3$(1.5) + CoO(0.39) | 5 |
| 15 | C | $Y_2O_3$(0.5) | 3 |
| 16 | C | $Yb_2O_3$(1.0) + CoO(0.13) | 5 |
| 17 | A | $Yb_2O_3$(0.5) + $Nd_2O_3$(1.0) | 3 |
| 18 | A | $Yb_2O_3$(0.5) + $TiO_2$(0.5) | 5 |
| 19 | B | $Yb_2O_3$(0.5) + $Sm_2O_3$(0.5) | 3 |
| 20 | B | $Yb_2O_3$(0.5) + $Sm_2O_3$(1.0) | 3 |
| 21* | A | $Y_2O_3$(1.5) | 7 |
| 22* | A | $Y_2O_3$(1.5) | 10 |
| 23* | B | $Y_2O_3$(1.0) + CaO(0.26) | 7 |
| 24* | B | $Y_2O_3$(1.0) + CaO(0.26) | 10 |
| 25* | C | $Yb_2O_3$(0.5) + $Nd_2O_3$(0.5) | 15 |
| 26* | C | $Yb_2O_3$(1.0) + $Nd_2O_3$(1.0) | 15 |

Note: Samples denoted by * in the table are comparative samples.
Two sintering temperatures, i.e. 1750° C. and 1900° C., were used for each sample.

The density, thermal conductivity and mechanical strength of each sintered body sample obtained were measured. The ratio b/a of the lengths of the axes b and a of the AlN crystals in the vicinity of the grain boundary phase was measured at 10 points through convergent beam electron diffraction by TEM and the absolute value |1−b/a| was found from the average value. The results are shown in Table 4 together with the sintering temperature and cooling rate.

TABLE 4

| Sample No. | Sintering temp (°C.) | Cooling rate (°C./min) | Density (g/cm³) | \|1 − b/a\| near grain boundary | Thermal conductivity (W/m · K) | Mechanical strength (kg/mm²) |
| --- | --- | --- | --- | --- | --- | --- |
| 11 | 1900 | 3 | 3.27 | 0.001 | 220 | 44 |
|    | 1750 | 3 | 3.27 | 0.002 | 170 | 38 |
| 12 | 1900 | 5 | 3.28 | 0.001 | 230 | 44 |
|    | 1750 | 5 | 3.28 | 0.001 | 160 | 38 |
| 13 | 1900 | 5 | 3.28 | 0.002 | 245 | 44 |
|    | 1750 | 5 | 3.27 | 0.002 | 170 | 36 |
| 14 | 1900 | 5 | 3.28 | 0.002 | 230 | 43 |
|    | 1750 | 5 | 3.29 | 0.001 | 165 | 37 |
| 15 | 1900 | 3 | 3.27 | 0.001 | 235 | 43 |
|    | 1750 | 3 | 3.27 | 0.001 | 175 | 38 |
| 16 | 1900 | 5 | 3.28 | 0.003 | 207 | 43 |
|    | 1750 | 5 | 3.29 | 0.003 | 165 | 37 |
| 17 | 1900 | 3 | 3.28 | 0.002 | 214 | 45 |
|    | 1750 | 3 | 3.27 | 0.002 | 155 | 37 |
| 18 | 1900 | 5 | 3.27 | 0.003 | 225 | 43 |
|    | 1750 | 5 | 3.28 | 0.002 | 160 | 36 |
| 19 | 1900 | 3 | 3.28 | 0.002 | 220 | 43 |
|    | 1750 | 3 | 3.28 | 0.002 | 157 | 36 |
| 20 | 1900 | 3 | 3.29 | 0.003 | 210 | 42 |
|    | 1750 | 3 | 3.29 | 0.003 | 160 | 36 |
| 21* | 1900 | 7 | 3.28 | 0.004 | 175 | 33 |
|     | 1750 | 7 | 3.28 | 0.005 | 115 | 29 |
| 22* | 1900 | 10 | 3.29 | 0.005 | 170 | 31 |
|     | 1750 | 10 | 3.29 | 0.005 | 112 | 29 |
| 23* | 1900 | 7 | 3.28 | 0.004 | 180 | 35 |
|     | 1750 | 7 | 3.28 | 0.004 | 120 | 30 |

TABLE 4-continued

| Sample No. | Sintering temp (°C.) | Cooling rate (°C./min) | Density (g/cm³) | |1 − b/a| near grain boundary | Thermal conductivity (W/m · K) | Mechanical strength (kg/mm²) |
| --- | --- | --- | --- | --- | --- | --- |
| 24* | 1900 | 10 | 3.28 | 0.004 | 160 | 33 |
|  | 1750 | 10 | 3.28 | 0.004 | 127 | 31 |
| 25* | 1900 | 15 | 3.29 | 0.005 | 160 | 34 |
|  | 1750 | 15 | 3.29 | 0.005 | 100 | 27 |
| 26* | 1900 | 15 | 3.29 | 0.005 | 150 | 32 |
|  | 1750 | 15 | 3.29 | 0.004 | 130 | 31 |

Note: Samples denoted by * in the table are comparative samples.

According to this invention, distortion of aluminum nitride crystals can be eliminated or minimized not only near the crystal grain center, but also near the grain boundary phase. Especially, this effect is highly enhanced by the addition of one or more compounds of Ti, V and Co. Consequently, the thermal Conductivity and mechanical strength of the aluminum nitride sintered body are largely improved, so that the aluminum nitride sintered body according to this invention is highly suitable for use as heat slingers, substrates or packaging materials for semiconductor devices, laser tubes or the like.

What is claimed is:

1. An aluminum nitride sintered body comprising aluminum nitride crystals belonging to a Wurtzite hexagonal crystal system wherein the 3 axes a, b and c of the unit lattice of the crystal are defined where by a ratio b/a of the lengths of the axes b and a is 1.000 near the crystal grain center and is 0.997–1.003 in the vicinity of the grain boundary phase.

2. The aluminum nitride sintered body of claim 1 wherein the sintered body has a thermal conductivity of at least 150 W/m.K.

3. The aluminum nitride sintered body of claim 1 wherein the sintered body has a three point flexural strength of at least 35 kg/mm².

4. A method of manufacturing an aluminum nitride sintered body, said method comprising sintering a body molded from a raw material powder having aluminum and nitrogen as its principal components at a temperature of 1700°–1900° C. in a non-oxidizing atmosphere having a partial pressure of carbon monoxide or carbon of not more than 200 ppm, to form a sintered body, and cooling said sintered body to 1500° C. or less at a maximum rate of 5° C./min or less.

5. A method of manufacturing an aluminum nitride sintered body as defined in claim 4 wherein said raw material powder is sintered after the addition of at least one compound of Ti, V and Co.

* * * * *

UNITED STATES PATENT AND TRADEMARK OFFICE
CERTIFICATE OF CORRECTION

PATENT NO. : 5,529,962
DATED : June 25, 1996
INVENTOR(S) : SEIJI NAKAHATA et al It is certified that error appears in the above-identified patent and that said Letters Patent is hereby corrected as shown below:

On the title page,

Change " [*] Notice: The portion of the term of this patent subsequent to January 9, 1996 has been disclaimed." to read
-- [*] Notice: The portion of the term of this patent subsequent to January 5, 2014 has been disclaimed.--

Signed and Sealed this

Sixteenth Day of September, 1997

Attest:

BRUCE LEHMAN

*Attesting Officer*     *Commissioner of Patents and Trademarks*